April 17, 1951 H. C. SWEET ET AL 2,549,722
LINE MARKING DEVICE
Filed Oct. 12, 1946 3 Sheets-Sheet 1
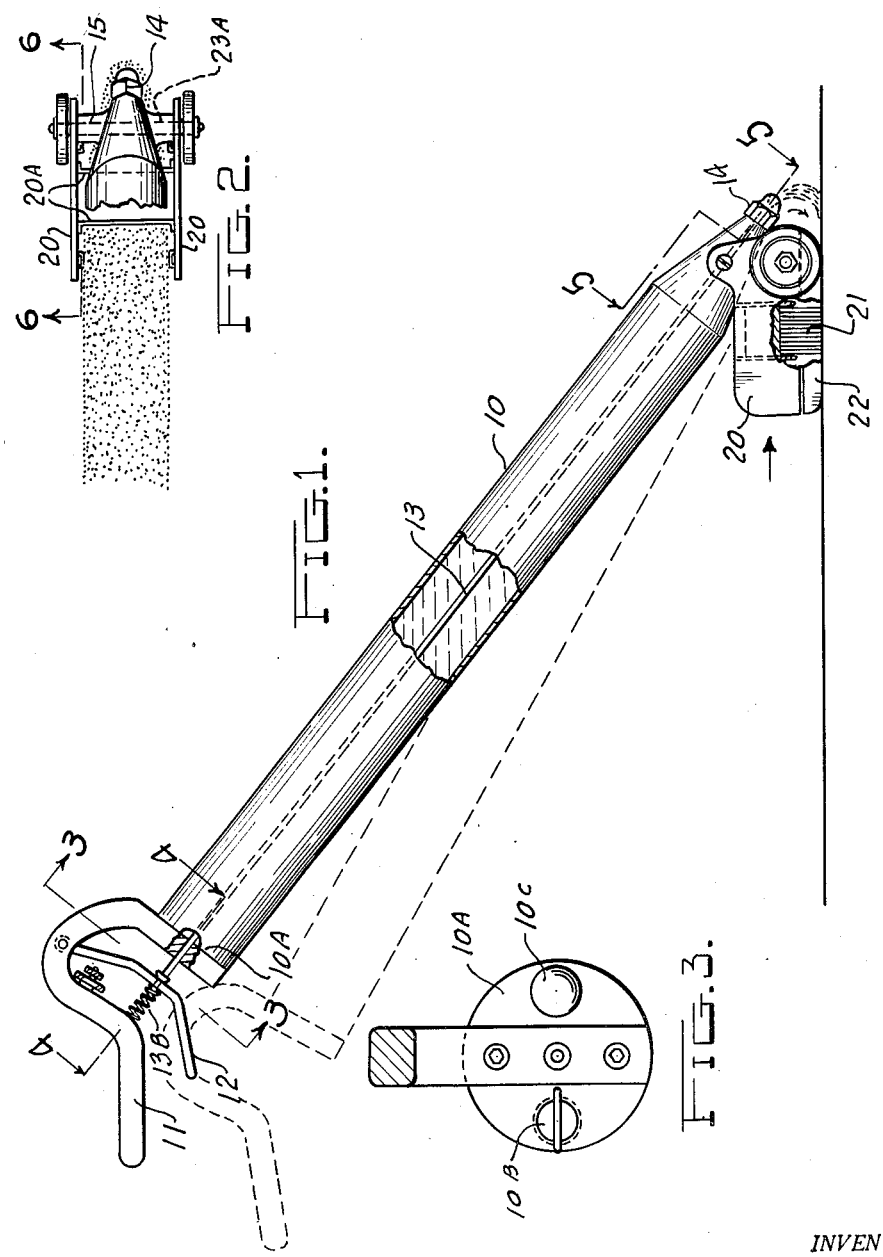
INVENTORS
Harold C. Sweet &
BY William A. Chilman
Hauke & Hardesty
ATTORNEYS April 17, 1951 H. C. SWEET ET AL 2,549,722
LINE MARKING DEVICE
Filed Oct. 12, 1946 3 Sheets-Sheet 2

INVENTOR.
Harold C. Sweet
BY William A. Chilman
Hauke & Hardesty
ATTORNEYS

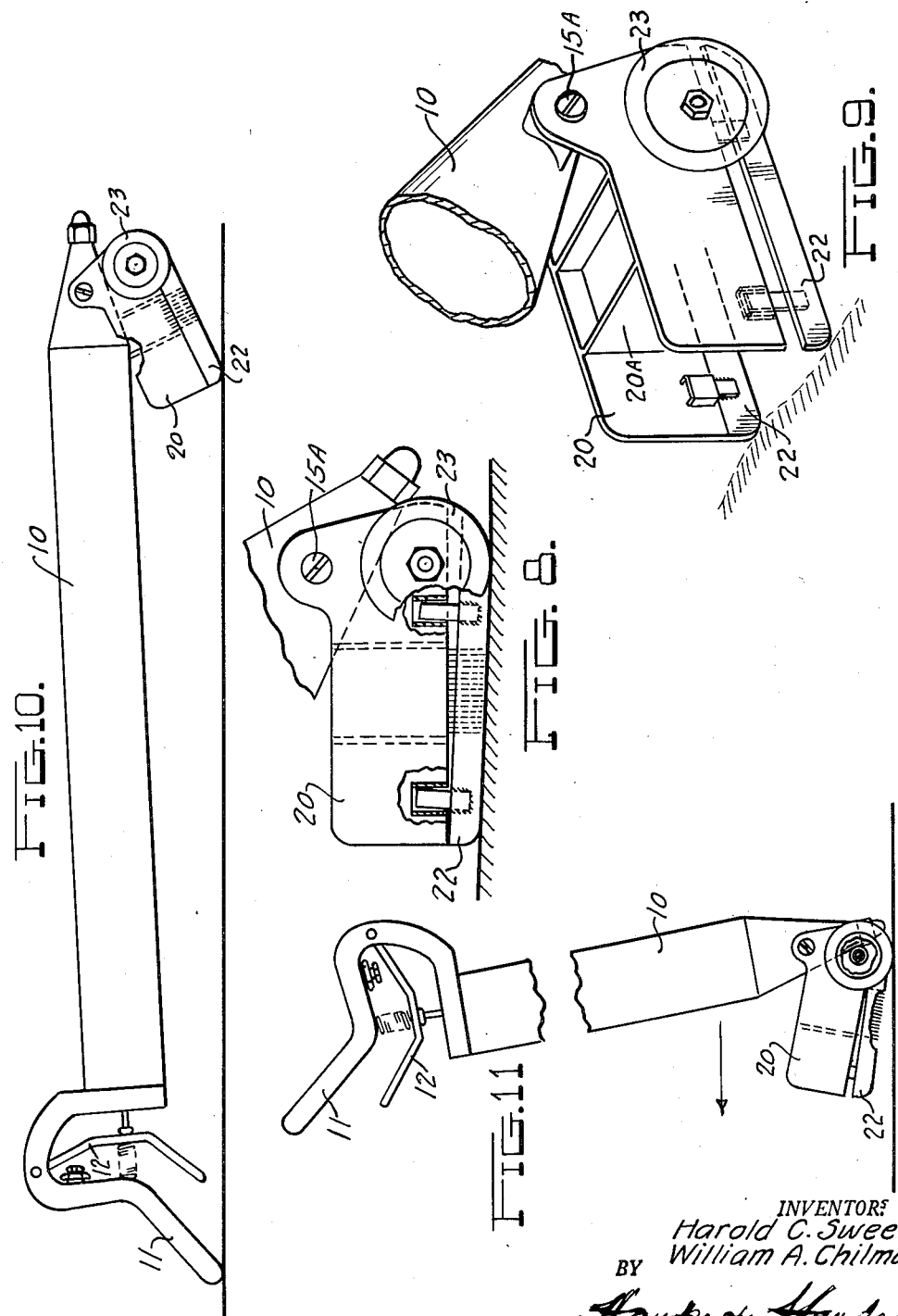

Patented Apr. 17, 1951

2,549,722

UNITED STATES PATENT OFFICE 2,549,722

LINE MARKING DEVICE

Harold C. Sweet and William A. Chilman, Detroit, Mich., assignors to H. C. Sweet Company, Detroit, Mich., a partnership composed of Harold C. Sweet and William A. Chilman Application October 12, 1946, Serial No. 702,916

1 Claim. (Cl. 91—12)

1

The present invention relates to line marking devices and specifically to such devices carrying a reservoir of marking liquid and means for applying such liquid to a floor, pavement or the like in a well defined line.

Among the objects of the invention is a fountain line marker which is simple, efficient, and economical.

Another object is a line marker which is easy to operate and which spreads the coating material evenly and to a uniform width.

Other objects will readily occur to those skilled in the art upon reference to the following description and the accompanying drawings, and in which:

Fig. 1 is a side elevation with parts in section,

Fig. 2 is a plan view of the lower end of the device,

Fig. 3 is a section on line 3—3 of Fig. 1,

Fig. 8 is a detail side elevational view showing the machine riding over a bump, Fig. 9 is a detail rear end view showing the machine riding over a bump raising one side only of the machine, Fig. 10 is an elevational view showing the machine laid down when not in use, and Fig. 11 is an other elevational view showing the operation of the machine when backing up.

Figure 4:
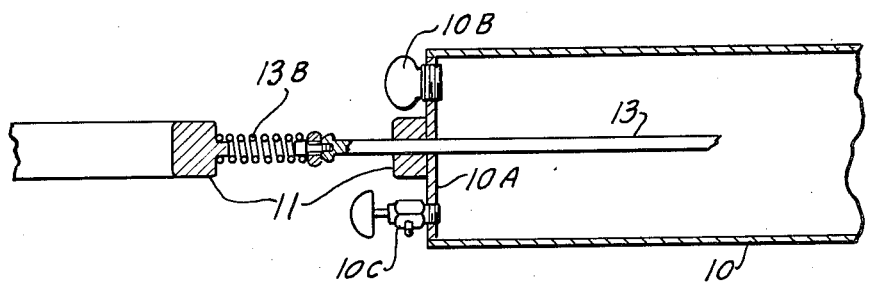
Fig. 4 is a section on line 4—4 of Fig. 1.
Figure 5:
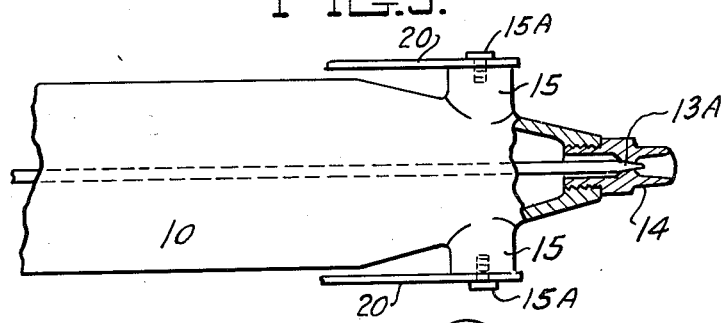
Fig. 5 is a section on line 5—5 of Fig. 1.
Figure 6:
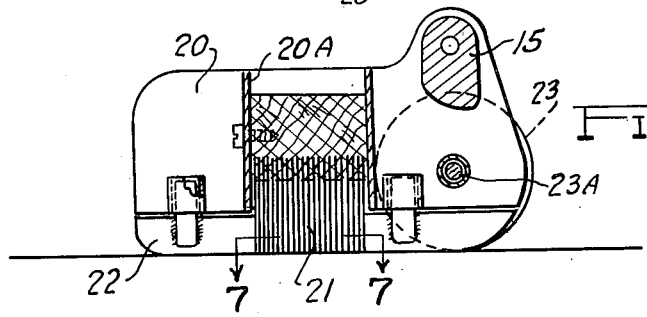
Fig. 6 is a section on line 6—6 of Fig. 2.

As indicated in the drawings, the marker comprises a tubular handle 10 of relatively large diameter constituting a reservoir or fountain for the marking fluid, usually a paint. This is closed at the upper end by a plate 10A to which is fixed a goose-neck handle 11. The plate 10A is provided with a suitable plug 10B which closes the filling opening, and a vent opening in said plate is preferably regulatably closed by a pet cock 10C.

Pivoted on handle 11 is a lever 12 by means of which may be operated a rod 13 extending through plate 10A to and through fountain 10 to the lower end of the latter where it is sharpened and constitutes a needle valve 13A for the nozzle 14, the latter being fixed to the tapered lower end of fountain 10. A suitable spring 13B tends to thrust the rod 13 downwardly toward valve-closed position.

Near the lower or nozzle end, the tube 10 is provided with trunnions 15 providing means for pivoting to the tube the brush carrying assembly or car, as by pins or screws 15A.

2

Figure 7:
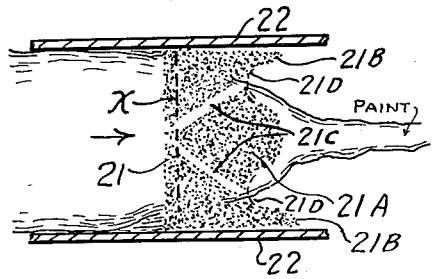
Fig. 7 is a detail sectional view taken on the line 7—7 of Fig. 6.

This assembly or car consists of side plates 20 fixed together by cross plates 20A which cross plates also serve as means for holding a brush 21 which in normal operation is spaced a short distance behind the nozzle 14. Brush 21 is preferably of the form shown in Fig. 7, that is, it is E-shaped in plan with the center and side tongues 21A and 21B preferably of somewhat stiffer bristles than the rest of the brush, in order to spread the paint or other marking fluid that is deposited on the floor or pavement ahead of the brush. Preferably the bristles of this brush generally forward of the dotted line X are constructed to spread the paint while those bristles to the rear of dotted line X are constructed to smooth down the paint. Usually this is accomplished by making the forward bristles stiffer than the rear bristles. The brush portion forward of this dotted line X which serve to spread the paint are so assembled to provide a space or open channels 21C which converge rearwardly as shown in Fig. 7. The paint, when deposited as shown, is spread laterally to both sides of the tongue 21A and tends to accumulate to some extent in the pockets 21D. The paint is spread outwardly to cover substantially the entire space between the side plates 22, but to further facilitate the spreading of the paint and to obviate the tendency of the central part of the strip becoming starved, the paint is caused to also flow toward the center from said pockets 21D by reason of the channels 21C. This particular brush construction attains a very uniform spreading of the paint or other marking liquid for the full width of the brush and a uniform smoothing of said paint by the bristles at the rear of the brush.

One each of plates 20 are carried the edge limiting plates or strips 22 and these are so mounted as to be freely movable up or down and thus to contact the surface being marked.

The brush carrying assembly is also provided with wheels or rollers 23 carried on the ends of an axle 23A extending through the plates 20 below the screws 15A and serving to support the plates and end of fountain 10.

Normally the plates 22 substantially meet or contact with the lower edge of side plates 20. However, when one side of the other rides over a bump the other side of the machine has a tendency to rise, and therefore these plates 22 are supported to be independently movable vertically so that the plates 22 on both sides of the machine will tend to ride on the floor or pavement surface at all times. Also when one side of the machine passes over a depression in the floor or pavement, the plate 22 associated with that side of the machine falls by gravity into said depression. Also as shown in Fig. 8, it will be seen that these side plates may easily rock on riding over a small bump and will tend to remain in contact with the pavement when the wheels ride over a bump which momentarily lifts the whole machine.

It may be here noted that the brush 21 is closely adjacent to the wheels 23, and thus when following a curve, the brush closely tracks the wheels and most of the side sweep is eliminated.

The machine may be laid down as illustrated by Fig. 10, the carriage resting on the ground at its lower rear corner, as the barrel or tubular handle 10 engages the cross plates 20A, and thus the brush is raised off the ground. This is advantageous as with each use of the machine, it is desirable to clean the brush, and thus the cleaning liquid is free to drain off the bristles, leaving same clean and in proper condition for further use.

In the operation of this machine, the paint or other marking fluid sometimes fails to flow freely, due usually to the fact that a lump in the paint momentarily prevents the free flow thereof, or due to some extreme irregularity in the pavement, the paint is unevenly applied. With the present machine, it is very easy to back up the machine and retrace the path to insure proper application of the paint. This is done by raising the handle so that the forward end of said handle engages the axle 23A, and then further raising the handle as illustrated by Fig. 11, which raises the brush off the pavement permitting the machine to be backed up without smearing or brushing such paint as has already been laid down. Of course, the valve 13A is closed when backing up.

As shown by the dotted line position of handle 10 in Fig. 1, it will be evident that the machine is readily adjusted for easy operation by operators of different stature.

In the normal operation of the device, it is pushed ahead of the operator with the brush assembly trailing the nozzle 14 and as the coating liquid is permitted to flow upon the surface to be marked, it is to a considerable extent divided by the tongue 21A of the brush and spread evenly the width of the brush. The limiting plates 22 will prevent spread laterally beyond the brush so as to produce a sharply defined stripe or band of the coating fluid.

It will be apparent to those skilled in the art to which the invention pertains, that various modifications and changes may be made therein without departing from the spirit of this invention or from the scope of the appended claim.

We claim:

A line marker for floors or other surfaces consisting of a tubular member constituting a reservoir adapted to contain a line marking fluid such as paint, and also adapted to serve as an operating handle, said member terminating at its forward end in a nozzle, means carried thereby to control the flow of fluid through said nozzle, a brush carrier pivotally mounted at the nozzle end of said reservoir, said nozzle projecting beyond the pivot point, said carrier comprising side plates and spaced cross plates arranged intermediate the ends of said side plates, supporting wheels for said carrier, said wheels being carried upon an axle extending through said side plates near the forward ends of the latter and in substantially vertical alignment with the said pivot point, said pivot point being spaced vertically from said axle to allow the reservoir handle to swing through a limited arc, a brush supported between said cross plates, said reservoir handle when swung beyond said limited arc adapted to lift said carrier and brush by striking one of said cross plates and swinging the carrier upwardly about the rear ends of the side plates as a fulcrum or by contacting the nozzle with the axle and lifting the carrier upon the wheels and axle as a fulcrum.

HAROLD C. SWEET.
WILLIAM A. CHILMAN.

REFERENCES CITED

The following references are of record in the file of this patent:

UNITED STATES PATENTS

| Number | Name | Date |
| --- | --- | --- |
| 1,503,556 | Rhien | Aug. 5, 1924 |
| 1,941,321 | Pridgen et al. | Dec. 26, 1933 |
| 1,956,602 | Wentz et al. | May 1, 1934 |
| 2,043,758 | Lay | June 9, 1936 |
| 2,116,407 | Nissly | May 3, 1938 |
| 2,290,302 | Terry | July 21, 1942 |